US006662736B1

(12) United States Patent
Lowe et al.

(10) Patent No.: US 6,662,736 B1
(45) Date of Patent: Dec. 16, 2003

(54) SEED PLANTER

(76) Inventors: Patrick R. Lowe, 1021 Shady La., Warsaw, IN (US) 46580; Ray H. Grumme, 6537 E. Waco Dr., Syracuse, IN (US) 46567

(*) Notice: Subject to any disclaimer, the term of this patent is extended or adjusted under 35 U.S.C. 154(b) by 0 days.

(21) Appl. No.: 10/253,365

(22) Filed: Sep. 24, 2002

(51) Int. Cl.[7] .................................................. A01C 5/02
(52) U.S. Cl. .......................................... 111/96; 111/900
(58) Field of Search .............................. 111/92, 93, 94, 111/95, 96, 97, 98, 99, 89, 90, 91, 100, 104, 105, 106, 107, 108, 114–117, 900

(56) References Cited

U.S. PATENT DOCUMENTS

| | | |
|---|---|---|
| 2,020,571 A | 11/1935 | Pick |
| 2,600,131 A | 6/1952 | Schwarm et al. |
| 2,747,528 A | 5/1956 | Hunkins |
| 3,799,081 A * | 3/1974 | Wilson ........................ 111/96 |
| 4,206,714 A | 6/1980 | Walsh |
| 4,290,374 A | 9/1981 | Maples |
| 4,614,160 A | 9/1986 | Curlett |
| 4,791,995 A | 12/1988 | Hochlan, Jr. |
| 5,493,977 A | 2/1996 | Maisch |
| 5,497,713 A | 3/1996 | Anderson et al. |
| 6,289,828 B1 | 9/2001 | Wittenberg |

* cited by examiner

Primary Examiner—Christopher J. Novosad
(74) Attorney, Agent, or Firm—Mary M. Moyne; Ian C. McLeod

(57) ABSTRACT

A seeding device for tilling the ground and distributing seed. The device includes a handle having a bracket with a seed container, the tilling plate and tilling tines mounted on the bracket. A seed distributor is provided to distribute seed over the ground. The seed distributor includes a plunger with a distribution plate. To use the seeding device, the user first inserts the tilling tines into the ground which moves the plunger upward toward the seed container and then removes the seeding device from the ground. The down and up movement moves seed from the seed container to the ground or the distribution plate. Seed on the distribution plate is moved off of the plate then moves the plunger into the extended position.

20 Claims, 6 Drawing Sheets

SEED PLANTER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION (1) Field of the Invention

The present invention relates to a seed planter for tilling and seeding a small area. In particular, the present invention relates to a seed planter which has a distribution plate which distributes the seed over the tilled area.

(2) Description of the Related Art

The related art shows various manual seeding devices which till the ground during seeding. Illustrative are U.S. Pat. Nos. 2,600,131 to Schwarm et al; 2,747,528 to Hunkins; 4,206,714 to Walsh; 4,290,374 to Maples; and 6,289,828 to Wittenberg.

Schwarm et al describes a seeding tool having a hollow tubular body member for storing the seed with teeth at the lower end. A valve is located in the body member and is opened by the user pushing a button.

Hunkins describes a ground perforator and seeder which has a container for the seeds, a handle having a hollow handle and a prong assembly. The prong assembly is mounted on the end of the hollow handle inside the container. The container has openings which allow the prongs of the prong assembly to extend outside the container and which allows the seeds to exit the container. The prongs fill the openings and prevent the seeds from exiting the container when the seeder is being used to perforate the ground.

Walsh shows a seeding device having an upper tube with a storage hopper connected to a lower tube. A valve in the storage hopper opens and closes in response to movement of the lower tube toward and away from the upper tube.

Maples describes a hand-held seeder which has a tubular handle for storing the seeds which is connected to a cup member. The cup member has tooth-like projections for tilling the ground. The seeder has no moving parts. The seeds fall from the handle into the cup member and are jostled out of the cup member onto the ground during the tilling movement.

Wittenberg describes a manually operated seeding and tilling device. The device includes a tubular feed handle having a seed retaining chamber with a portal for loading the chamber. A tined tilling member is positioned on the end of the handle. The handle also has a handle to allow for rotating the handle about the longitudinal axis of the handle to increase the churning effect of the tines. The bottom end of the handle also has a valving means for discharging seeds from the seed chamber.

Also of interest are U.S. Pat. Nos. 4,614,160 to Curlett and 5,493,977 to Maisch which show single penetration seed planters.

Only of minimal interest are U.S. Pat. No. 5,497,713 to Anderson et al which shows a garden seeder which allows for dispensing a predetermined volume of seeds; U.S. Pat. No. 2,020,571 to Pick and U.S. Pat. No. 4,791,995 to Hochlan, Jr. which show manual tilling devices.

There remains the need for a manual seeding device which is easy to use and which provides for tilling the ground and distribution of seed over the tilled ground.

SUMMARY OF THE INVENTION

The present invention relates to a seed planter or seeding device which has tilling tines for tilling the ground and a seed distributor for distributing the seed over the tilled ground. The seed planter includes a handle having a bracket at one (1) end. The seed container, the tilling plate and tilling tines are mounted on the bracket. The bracket can be U-shaped to transfer the force applied by the user at the first end of the bracket to the tilling tines mounted on the second end of the bracket. The seed container is mounted between the legs of the container. The seed container is removably mounted to a lid which is mounted to a mounting plate extending between the legs of the bracket at the second end of the bracket. The lid has holes in fluid communication with the inner chamber of the seed container. The mounting plate has holes adjacent the holes in the lid to allow the seed from the seed container to pass through the lid and the mounting plate. The tilling plate with the tilling tines is mounted on the mounting plate on the side opposite the seed container. The tilling plate has a center opening with tilling tines mounted around a perimeter of the tilling plate. The tilling tines can be cylindrical with a point at one end similar to a nail. The tilling tines may also have horizontal grooves similar to threads which help to increase the tilling ability of the tilling tines. A metering valve can be provided adjacent the holes in the lid to adjust the amount of seed flowing from the seed container. A seed distributor is provided to distribute the seed over the tilled ground. The seed distributor includes a plunger with a distribution plate mounted at one (1) end. The plunger extends from the inner chamber of the seed container through the lid, mounting plate and tilling plate. The distribution plate is mounted on the second end of the plunger adjacent the second end of the tilling tines. A coil spring extends between the distribution plate and the mounting plate and acts to move the plunger into the fully extended position. To use the seeding device, the seed container is filled with seed and secured to the lid. The user then positions the tilling tines near the ground and applies a downward force. The downward force inserts the tilling tines into the ground and moves the second end of the plunger into contact with the ground which causes the plunger to retract or move upward toward the seed container. The user then removes the seeding device from the ground by applying an upward force on the handle. As the seeding device is moved down and up, seed is moved from the seed container through the lid, mounting plate and center opening of the tilling plate and deposited either on the ground or the distribution plate. Seed which lands on the distribution plate is moved off of the plate when the seeding device is moved away from the ground and the coil spring moves the plunger into the fully extended position. The seed on the distribution plate is distributed over a larger area due to the movement of the plunger and distribution plate.

The present invention relates to a seeding device for manually tilling and seeding ground which comprises: a handle having opposed first and second ends forming a longitudinal axis of the device; a seed container having opposed first and second ends with an opening in the second end and removably mounted on the second end of the handle; tilling tines mounted adjacent the second end of the seed container and extending outward from the seed container in a direction opposite the handle; a plunger having opposed first and second ends and mounted through the second end of the seed container such that the first end of the plunger is positioned in the seed container and the second end of the plunger extends outward from the second end of the seed container in the direction opposite the handle; a distribution plate mounted on the second end of the plunger; and resilient member spaced between the distribution plate and the second end of the seed container for biasing the plunger into a fully extended position.

Further, the present invention relates to a seeding device for manually tilling and seeding ground which comprises: a handle having opposed first and second ends forming a longitudinal axis of the device; a bracket having opposed first and second ends and mounted at the first end to the second end of the handle; a seed container having opposed first and second ends with an opening in the second end and removably mounted on the bracket such that the second end of the container is adjacent the second end of the bracket; tilling tines mounted on the second end of the bracket and extending outward from the bracket in a direction opposite the seed container; a plunger having opposed first and second ends and mounted adjacent the second end of the bracket such that the first end of the plunger is positioned in the seed container and the second end of the plunger extends outward from the second end of the bracket in the direction opposite the seed container; a distribution plate mounted on the second end of the plunger; and a resilient member spaced between the distribution plate and the second end of the bracket for biasing the plunger into a fully extended position.

Still further, the present invention relates to a method for tilling and seeding ground, which comprises the steps of: providing a seeding device having a handle with opposed first and second ends forming a longitudinal axis of the device; a seed container having opposed first and second ends with an opening in the second end and removably mounted on the second end of the handle; tilling tines mounted adjacent the second end of the seed container and extending outward from the seed container in a direction opposite the handle; a plunger having opposed first and second ends and mounted adjacent the second end of the seed container such that the first end of the plunger is positioned in the seed container and the second end of the plunger extends outward from the second end of the seed container in the direction opposite the handle; a distribution plate mounted on the second end of the plunger; and a resilient member spaced between the distribution plate and the second end of the seed container for biasing the plunger into a fully extended position; removing the seed container from the handle; filling the seed container with seed; removably mounting the seed container on the handle; grasping the first end of the handle; moving the seeding device toward the ground such that the second end of the plunger contacts the ground and is retracted toward the seed container and such that the tilling tines enter the ground wherein when the plunger contacts the ground, seed in the seed container moves through the opening in the seed container and contacts the distribution plate; and moving the seeding device away from the ground such that the tilling tines are removed from the ground and the plunger is moved to the fully extended position by the resilient member, where seed contacting the distribution plate is distributed onto the ground.

The substance and advantages of the present invention will become increasingly apparent by reference to the following drawings and the description.

BRIEF DESCRIPTION OF THE DRAWING(S)

FIG. 1 is a perspective view of the seeding device 10.

FIG. 2 is a cross-sectional view along the line 2—2 of FIG. 1 showing the seed container 18 and the plunger 34 with the distribution plate 36.

Figure 6:
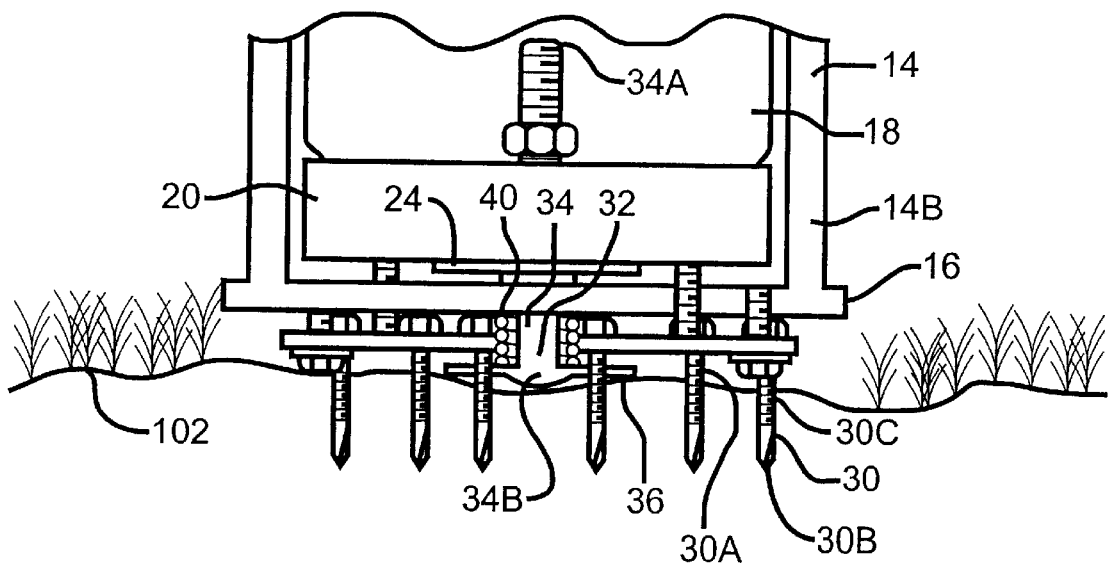

FIG. 6 is a partial view of the seeding device 10 during use, showing the tilling tines 30 in the ground and the plunger 34 in a retracted position.

Figure 7:
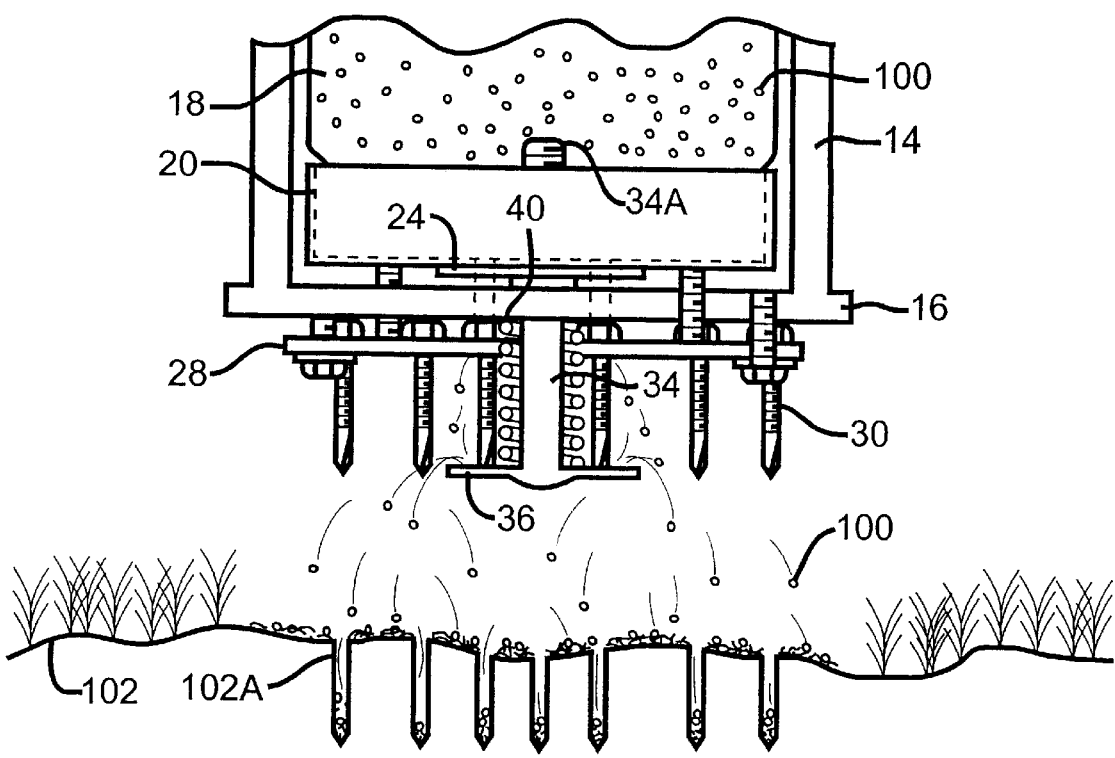

FIG. 7 is a partial view of the seeding device 10 after use, showing the seed 100 and the tilled holes 102A in the ground 102.

Figure 8:
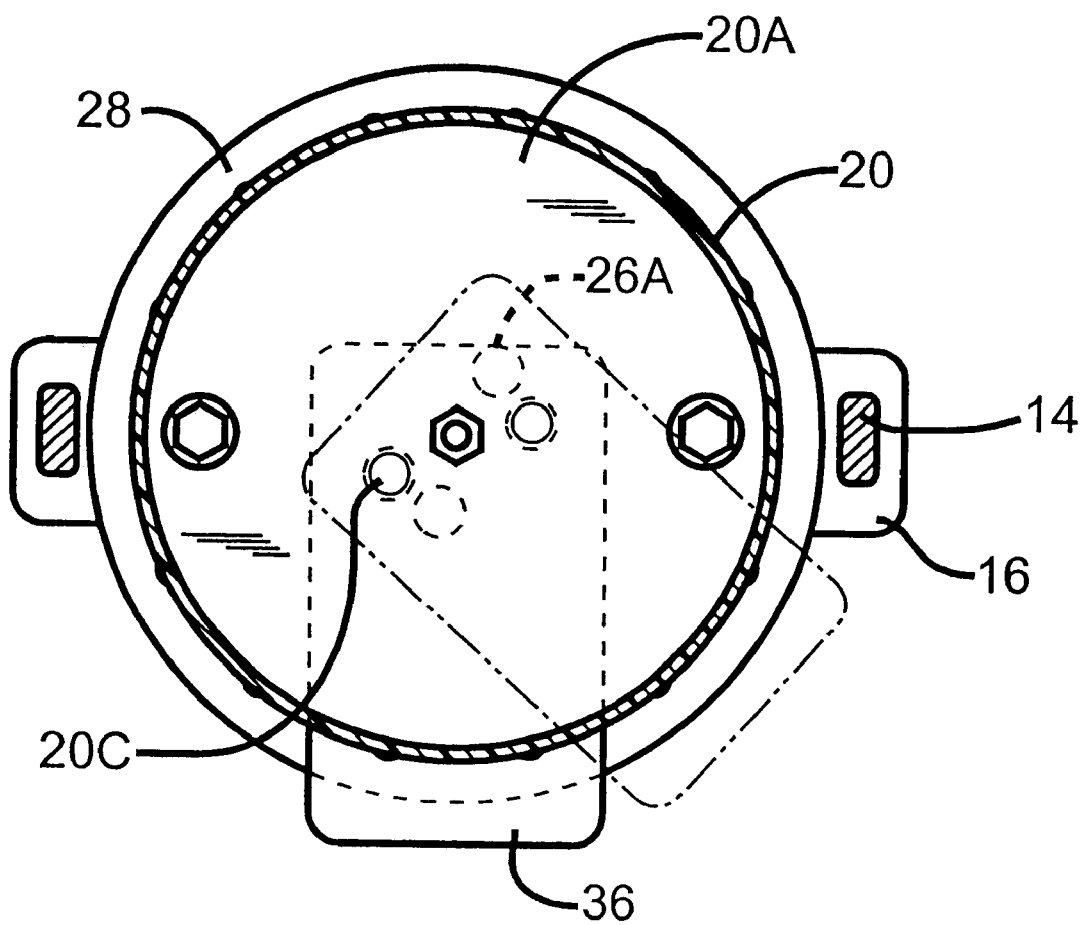

FIG. 8 is a top cross-sectional view through the lid 20 showing the lever 26 for the valve 24 and the holes 20C in the lid 20.

DESCRIPTION OF THE PREFERRED EMBODIMENT(S)

Figure 1:
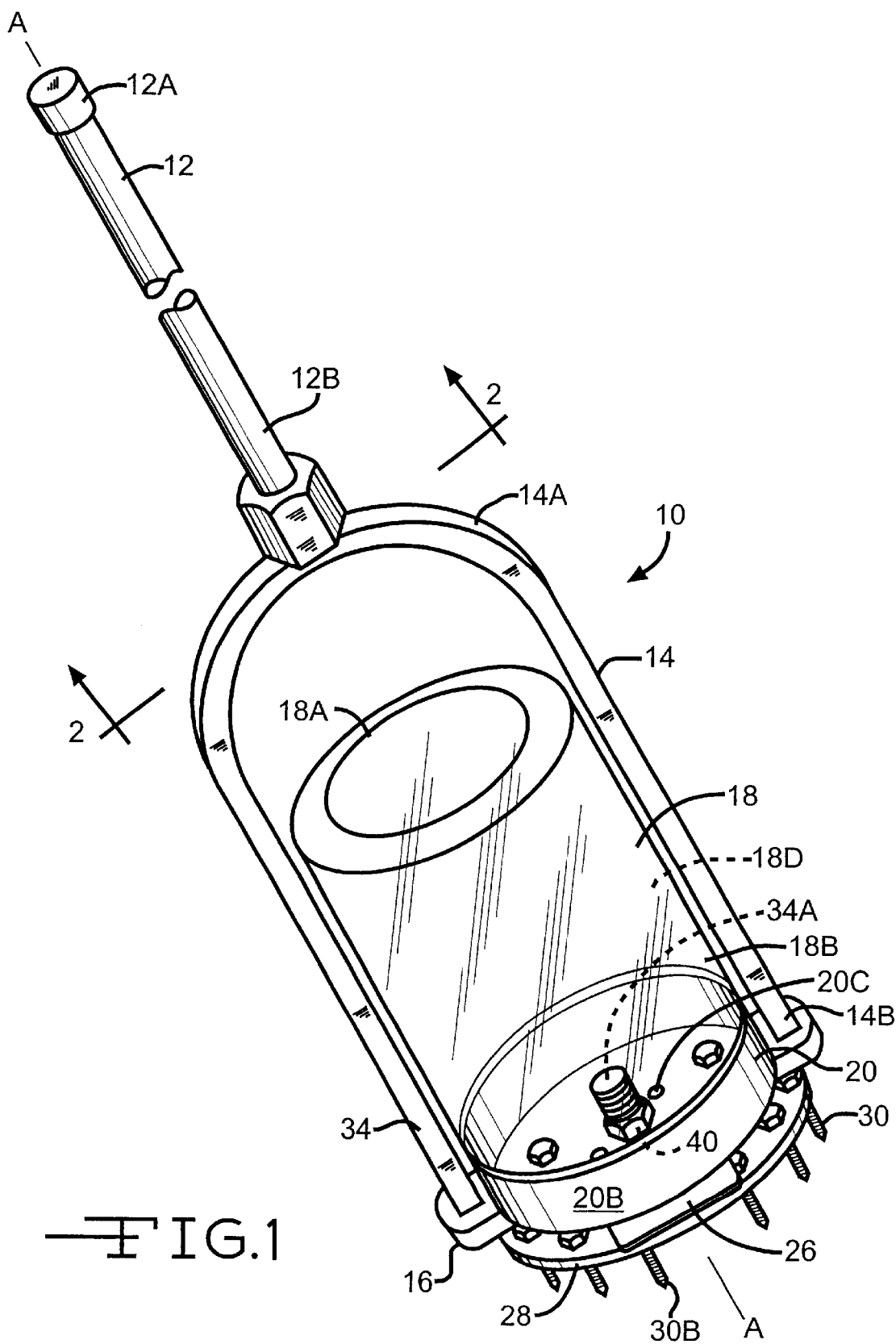
Figure 2:
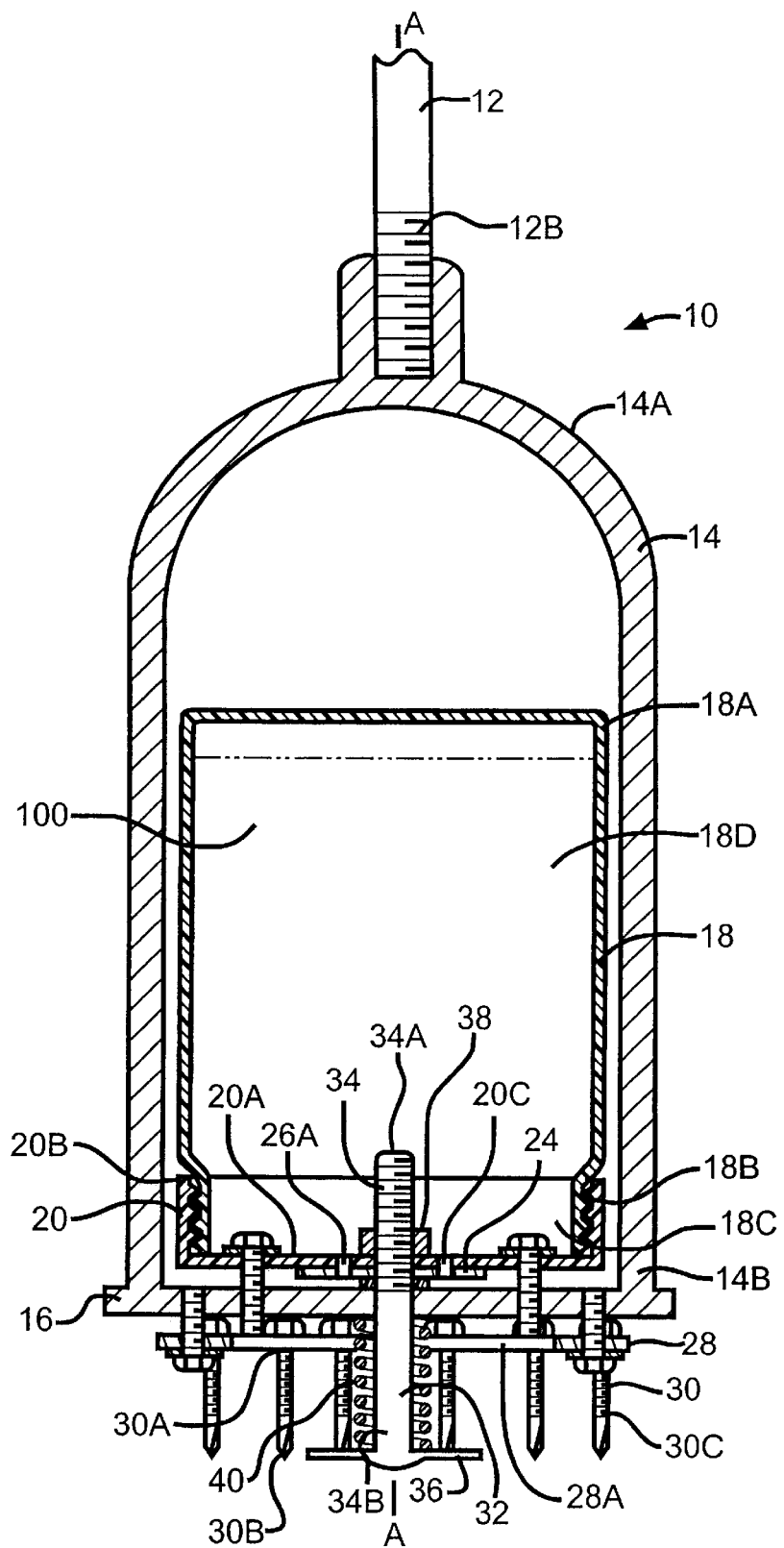

FIGS. 1 and 2 show the seeding device 10 or seed planter of the present invention. The seeding device 10 includes a handle 12, a seed container 18, tilling tines 30 and a seed distributor 32. The handle 12 has a first end 12A and a second end 12B forming a longitudinal axis A—A of the device 10. The handle 12 is of such a length as to enable an ordinary user to use the seeding device 10 while remaining essentially in an upright position. The handle 12 can be constructed of any durable, lightweight material. A bracket 14 for mounting the seed container 18, tilling tines 30 and 230 and seed distributor 32 is mounted on the second end 12A of the handle 12. The bracket 14 has a first end 14A and a second end 14B with a first leg and a second leg extending between the ends 14A and 14B. In one (1) embodiment, the bracket 14 is U-shaped and the legs are spaced apart at the second end 14B and connected together at the first end 14A with the legs extending parallel to the longitudinal axis A—A of the seeding device 10. The first end 14A of the bracket 14 is connected to the second end 12B of the handle 12. In one (1) embodiment, the bracket 14 is removable from the handle 12 to allow for easier shipping and storage of the seeding device 10 (FIG. 2). A mounting plate 16 extends between the legs of the bracket 14 at the second end 14B of the bracket 14. The mounting plate 16 extends essentially perpendicular to the legs of the bracket 14 and the longitudinal axis A—A of the seeding device 10. The bracket plate 16 can have any shape such as rectangular. The bracket 14 and the mounting plate 16 can be constructed as a unitary piece. The bracket 14 and mounting plate 16 can be constructed of any durable material which is preferably lightweight. In one (1) embodiment, the bracket 14 and mounting plate 16 are constructed of steel.

The seed container 18 is mounted between the legs of the bracket 14 (FIG. 1). The seed container 18 has a first end 18A and a second end 18B with an opening 18C in the second end 18B into the inner chamber 18D formed between the ends 18A and 18B. The seed container 18 is positioned on the bracket 14 such that the first end 18A of the seed container is adjacent the first end 14A of the bracket 14 and the second end 18B of the seed container 18 is adjacent the second end 14B of the bracket 14. The seed container 18 has a height between the ends 18A and 18B less than the height of the bracket 14 between the ends 14A and 14B, thus allowing the second end 18B of the seed container 18 to be grasped for removal from the bracket 14. The width of the seed container 18 is less than the distance between the legs of the bracket 14 such that the seed container 18 can be easily moved between the legs of the bracket 14. In one (1) embodiment, the seed container 18 has a cylindrical shape; however, the seed container 18 can have a variety of shapes and sizes. The seed container 18 can be constructed of any well known material which is lightweight and durable. In one (1) embodiment, the seed container 18 is transparent. A cap or lid 20 is provided to close the opening 18C in the second end 18B of the seed container 18 and to mount the seed container 18 to the bracket 14. The lid 20 is mounted on the mounting plate 16 between the legs of the bracket 14. The lid 20 can be mounted to the mounting plate 16 by any well known means. The shape and size of the lid 20 depends on the shape and size of the opening 18C in the second end 18B of the seed container 18. In one (1) embodiment, where the seed container 18 has a cylindrical shape, the lid 20 has an end wall 20A with a sidewall 20B extending outward from the inner side of the end wall 20A. The end wall 20A has a circular shape and the sidewall 20B has a cylindrical shape with threads on the inner surface. The second end 18B of the seed container 18 is provided with threads which threadably mate with threads on an inner surface of the sidewall 20B of the lid 20 to secure the seed container 18 to the lid 20. However, the seed container 18 can be secured to the lid 20 by any well known means. In one (1) embodiment, where the lid 20 and seed container 18 have a circular cross-section, the lid 20 is mounted on the mounting plate 16 such that the lid 20 and the seed container 18 are co-axial with the longitudinal axis A—A of the device 10. The end wall 20A of the lid 20 is provided with holes 20C. The mounting plate 16 has holes 16A which are aligned with the holes 20C in the lid 20. The holes 20C of the lid 20 are adjacent the opening 18C in the second end 18B of the seed container 18 and are in fluid communication with the inner chamber 18D of the seed container 18. In one (1) embodiment, the lid 20 and mounting plate 16 each have a pair of holes 20C and 16A evenly spaced apart around the longitudinal axis A—A of the seeding device 10. The size of the holes 20C in the lid 20 depends on the type of seed. The holes 16A in the mounting plate 16 have a size at least as large as the size of the holes 20C in the lid 20.

The seeding device 10 can be provided with a seed metering valve 24. The seed metering valve 24 is located between the end wall 20A of the lid 20 and the mounting plate 18. A bushing can be provided between the mounting plate 18 and the seed metering valve 24 to space the metering valve 24 apart from the plate 18 and to allow for easier rotation of the lever 26 of the metering valve 24. In one (1) embodiment, the bushing is constructed of nylon. The seed valve 24 includes a lever 26 pivotally mounted about the center of the lid 20 around the longitudinal axis A—A of the seeding device 10. The lever 26 is of such a length so as to extend beyond the edge of the end wall 20A of the lid 20 to allow the lever 26 to be rotated. The lever 26 has holes 26A having a size similar to the size of the holes 20C in the lid 20. When the seed metering valve 24 is fully open, the holes 26A in the lever 26 are aligned with the holes 20C in the lid 20 (FIG. 8). As the lever 26 is moved from fully open to fully closed, the holes 26A in the lever 26 become misaligned with the holes 20C in the lid 20. When the metering valve 24 is fully closed, the holes 26A in the lever 26 do not overlap and are not in fluid communication with the holes 20C in the lid 20. The amount of overlap between the holes 26A in the lever 26 and the holes 20C in the lid 20 determines the rate of flow of seed 100 from the seeding device 10. The lever 26 can be provided with indicia (not shown) to indicate the flow rate through the holes 20C in the lid 20. It is understood that other types of metering valves well known in the art could also be used. In one (1) embodiment, a filter or screen (not shown) can be provided between the lid 20 and the valve 24. The filter prevents oversized objects including seed 100 from exiting the seed container 18 through the openings and holes 20C in the lid 20.

Figure 3:
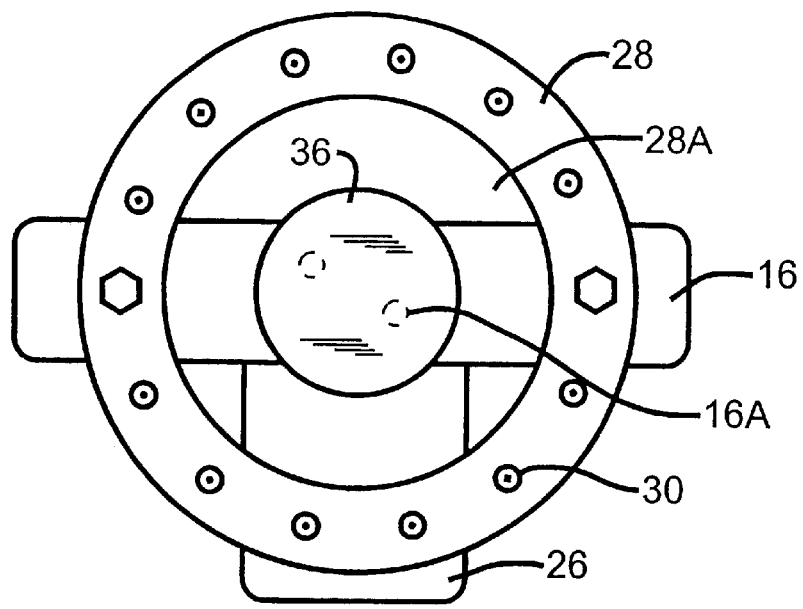
FIG. 3 is a bottom view of one (1) embodiment of the seeding device 10 showing the tilling tines 30.
Figure 4:
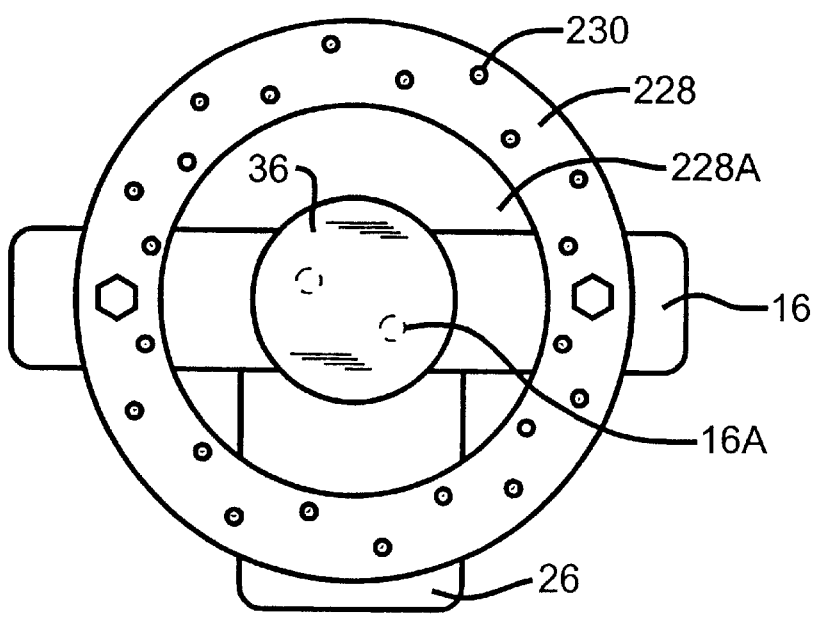
FIG. 4 is a bottom view of one (1) embodiment of the seeding device 10 showing the tilling tines 230.

A tilling donut or plate 28 or 228 having a center opening 28A and 228A is mounted on the side of the mounting plate 16 opposite the seed container 18 (FIGS. 3 and 4). In one (1) embodiment, the tilling plate 28 and 228 has a circular shape; however, the tilling plate 28 and 228 could have any shape such as square or rectangular. The center opening 28A and 228A of the tilling plate 28 and 228 can be of any shape. In one (1) embodiment, the center opening 28A and 228A is circular. The tilling plate 28 and 228 can be mounted to the mounting plate 16 by any well known means. The tilling plate 28 and 228 and mounting plate 16 can be constructed as a unitary piece. The tilling tines 30 and 230 have a first end 30A and a second end 30B and are mounted at the first end 30A to the tilling plate 28 and 228. The tilling tines 30 and 230 extend outward from the side of the tilling plate 28 and 228 opposite the seed container 18. In one (1) embodiment, the tilling tines 30 and 230 are removably mounted to the tilling plate 28 and 228 so that the tilling tines 30 and 230 can be individually replaced. The tilling tines 30 and 230 are preferably spaced around a perimeter of the tilling plate 28 and 228. The size, type and number of tilling tines 30 and 230 depends on the type of ground 102 to be tilled and the type of seed 100 to be planted. In one (1) embodiment, the tilling tines 30 and 230 have a cylindrical shape with a point at the second end 30B. In one (1) embodiment, a portion of the outer surface of the tilling tines 30 is provided with threads or grooves 30C extending perpendicular to the longitudinal axis A—A of the seeding device 10. The grooves 30C increase the amount of ground disturbed by each individual tilling tine 30, thus increasing the tilling ability of the tilling tines 30. In a first embodiment, a single row of tilling tines 30 is spaced around the tilling plate 28 between the center opening 28A and the perimeter of the tilling plate 28 (FIG. 3). In a second embodiment, several rows of tilling tines 230 are spaced on the tilling plate 228 between the center opening 228A and the perimeter of the tilling plate 228 (FIG. 4). In one (1) embodiment, the tilling tines 30 have a diameter of between approximately 0.14 inches (0.36 cm) and 0.25 inches (0.64 cm). In one (1) embodiment where the seed 100 to be planted is grass seed and the area is a golf course, the tilling tines 30 have a length of approximately 1.25 inches (3.18 cm).

The seed distributor 32 includes a plunger 34 and a distribution plate 36. The plunger 34 has a first end 34A and a second end 34B and is mounted such that the first end 34A of the plunger 34 is within the inner chamber 18D of the seed container 18 when the seed container 18 is secured on the lid 20. In one (1) embodiment, the plunger 34 is mounted along the longitudinal axis A—A of the device 10. The plunger 34 extends through a center hole in the lid 20, through a hole in the mounting plate 16 and through the center opening 28A of the tilling plate 28. The plunger 34 can be of any shape. In one (1) embodiment, the plunger 34 has a cylindrical shape. The distribution plate 36 is mounted on the second end 34B of the plunger 34. The plunger 34 and the distribution plate 36 can be constructed as a unitary piece. In one (1) embodiment, the plunger 34 is of such a length such that, in the fully extended position, the distribution plate 36 on the second end 34B of the plunger 34 extends beyond the second end 30B of the tilling tines 30. The distribution plate 36 is of such a size as to extend over the holes 20C in the lid 20 (FIG. 7). The distribution plate 36 can completely extend over all holes 20C in the lid 20 such that a majority of the seed 100 flowing from the holes 20C falls on the distribution plate 36. In one (1) embodiment, the distribution plate 36 is circular; however, it is understood that the distribution plate 36 could have a variety of shapes, such as square or rectangular. A stop 38 is provided on the plunger 34 adjacent the first end 34A of the plunger 34. When the plunger 34 is in the fully extended position, the stop 38 is adjacent and in contact with the inner side of the end wall 20A of the lid 20 (FIG. 1). The stop 38 prevents the plunger 34 from moving beyond the fully extended position. A coil spring 40 is provided around the plunger 34 between the distribution plate 36 and the mounting plate 16 (FIG. 2). The coil spring 40 biases the plunger 34 toward the fully extended position.

Figure 5:
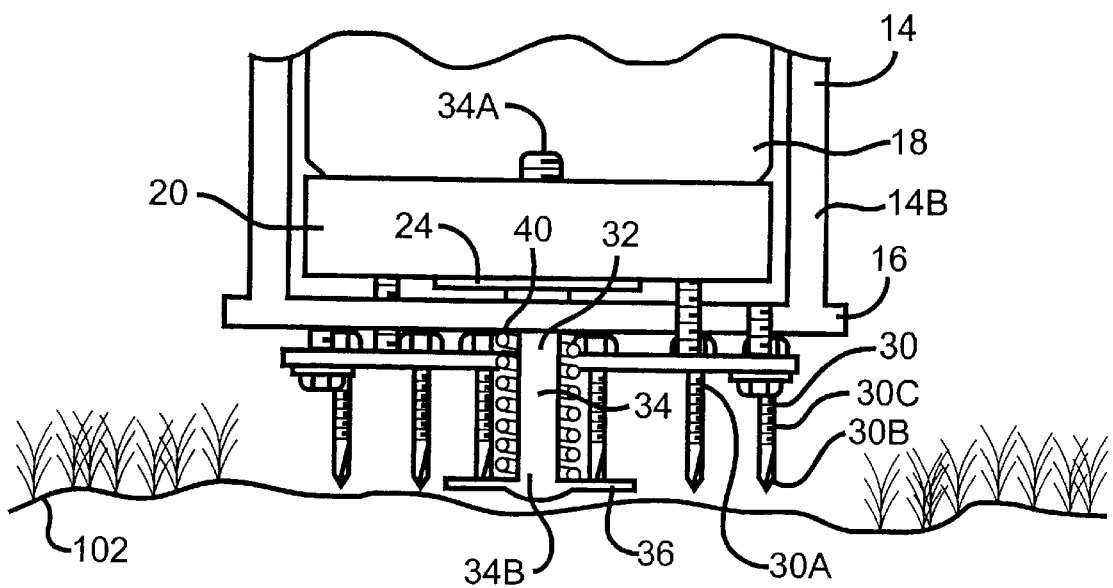
FIG. 5 is a partial view of the seeding device 10 prior to use.

The seeding device 10 is intended to allow users to easily and quickly seed a small area. The tilling tines 30 increase the effectiveness of the seeding device 10. The seeding device 10 can be used to plant grass seed in bare patches on golf courses or backyards. To use the seeding device 10, the seed container 18 is first filled with seed 100. However, it is understood that the seed container 18 could be left empty when the seed device 10 is to be used only to till the ground 102. To fill the seed container 18, the seed container 18 is removed from the lid 20. Seed 100 is filled into the inner chamber 18D through the opening 18C in the second end 18B of the seed container 18. The seed container 18 is then remounted onto the lid 20. To allow for less spillage of the seed 100 when mounting of the seed container 18, the seeding device 10 is rotated upside down or 1800 prior to mounting the seed container 18 such that the first end 12A of the handle 12 is adjacent the ground 102 and the tilling tines 30 and 230 are extending upward, away from the ground 102. Once the seed container 18 is secured to the lid 20, the seeding device 10 is rotated to the correct position with the tilling tines 30 and 230 adjacent the ground 102 (FIG. 5). Next, the metering valve 24 is adjusted to allow for the correct flow of seed 100 from the seed container 18 through the holes 20C in the lid 20. In one (1) embodiment, the metering valve 24 is fully closed when the seeding device 10 is not being used. Next, the user grasps the first end 12A of the handle 12 and positions the tilling tines 30 and 230 adjacent the ground 102 to be seeded. Preferably, the longitudinal axis A—A of the seeding device 10 is essentially perpendicular to the ground 102 during use. The user then moves the seeding device 10 toward the ground 102. The shape of the bracket 14 ensures that the downward force applied by the user is transferred to the tilling plate 28 and 228 and the tilling tines 30 and 230 and is not transferred to or through the seed container 18. This enables the user to apply a greater force and allows the seed container 18 to be constructed of a lightweight material. When the seeding device 10 contacts the ground 102, the plunger 34 is moved upward, toward the seed container 18 and the second ends 30B of the tilling tines 30 and 230 enter the ground 102 (FIG. 6). The movement of the second end 34B of the plunger 34 causes the coil spring 40 to compress and the first end 34A of the plunger 34 to move within the inner chamber 18D of the seed container 18. The movement of the first end 34A of the plunger 34 in the seed 100, acts to agitate the seed 100 and assists in moving the seed 100 out of the opening 18C in the seed container 18 and through the holes 20C in the lid 20. The depth of insertion of the tilling tines 30 and 230 in the ground 102, depends on the downward force applied by the user and the consistency of the ground 102. In one (1) embodiment, the seeding device 10 is moved downward until the tilling plate 28 and 228 contacts the ground 102. In this position, the tilling tines 30 and 230 are fully inserted into the ground 102. Once the tilling tines 30 and 230 have been inserted to the desired depth, the user pulls on the first end 12A of the handle 12 to move the seeding device 10 upward, away from the ground 102. The down and up motion of the seeding device 10 moves the seed 100 in the seed container 18 out the opening 18C of the seed container 18, through the holes 20C in the lid 20, through the holes 16A in the mounting plate 16, through the center opening 28A and 228A of the tilling plate 28 and 228 and onto the distribution plate 36 (FIG. 7). Some of the seed 100 will fall directly on the ground 102 and bypass the distribution plate 36. The seeding device 10 is preferably quickly moved upward and away from the ground 102. As the seeding device 10 is moved away from the ground 102, the coil spring 40 moves the plunger 34 back into the fully extended position. Preferably, the plunger 34 is quickly moved to the extended position which causes a jarring motion on the distribution plate 36 which causes the seed 100 on the distribution plate 36 to move off the distribution plate 36. In addition, seed 100 falling from the seed container 18 which hits the distribution plate 36 will bounce off the distribution plate and be distributed over the ground 102. The seed 100 falling from the seed container 18 will be distributed over the ground 102 which has been tilled by the tilling tines 30 and 230 and into the tilled holes 102A created by the tilling tines 30 and 230. The tilling of the ground 102 increases the likelihood that the seed 100 will grow.

It is intended that the foregoing description be only illustrative of the present invention and that the present invention be limited only by the hereinafter appended claims.

We claim:
1. A seeding device for manually tilling and seeding ground which comprises:
  (a) a handle having opposed first and second ends forming a longitudinal axis of the device;
  (b) a seed container having opposed first and second ends forming an inner chamber configured to hold seed with an opening in the second end of the seed container to allow seed to flow from the seed container, and removably mounted on the second end of the handle;
  (c) tilling tines mounted adjacent the second end of the seed container and extending outward away from the seed container in a direction opposite the handle;
  (d) a plunger having opposed first and second ends and mounted through the second end of the seed container such that the first end of the plunger is positioned completely within the inner chamber of the seed container and does not extend out of the inner chamber and the second end of the plunger is positioned outside of the seed container and extends outward away from the second end of the seed container adjacent the tilling tines in the direction opposite the handle, and spaced apart from the opening in the second end of the seed container;
  (e) a distribution plate mounted on the second end of the plunger and spaced apart from the opening in the second end of the seed container, so that the distribution plate does not interfere with the flow of seed from the seed container through the opening in the second end of the seed container; and
  (f) resilient member spaced between the distribution plate and the second end of the seed container for biasing the plunger into a fully extended position.

2. The device of claim 1 wherein a bracket having first and second ends is mounted at the first end to the second end of the handle.

3. The device of claim 2 wherein the bracket includes spaced apart legs extending between the first and second ends of the bracket with a space between the legs.

4. The device of claim 3 wherein the seed container is mounted in the space between the legs of the bracket such that the second end of the container is adjacent the second end of the bracket.

5. A seeding device for manually tilling and seeding ground which comprises:
   (a) a handle having opposed first and second ends forming a longitudinal axis of the device;
   (b) a bracket having opposed first and second ends and mounted at the first end to the second end of the handle;
   (c) a seed container having opposed first and second ends and configured to hold seed with an opening in the second end to allow seed to flow from the seed container and removably mounted on the bracket such that the second end of the container is adjacent the second end of the bracket;
   (d) tilling tines mounted on the second end of the bracket and extending outward from the bracket in a direction opposite the seed container;
   (e) a plunger having opposed first and second ends and mounted adjacent the second end of the bracket such that the first end of the plunger is positioned in the seed container and the second end of the plunger is positioned outside the seed container and extends outward away from the second end of the bracket in the direction opposite the seed container, and spaced apart from the opening in the second end of the seed container;
   (f) a distribution plate mounted on the second end of the plunger and spaced apart from the opening in the second end of the seed container, so that the distribution plate does not interfere with the flow of seed from the seed container through the opening in the second end of the seed container; and
   (g) a resilient member spaced between the distribution plate and the second end of the bracket for biasing the plunger into a fully extended position.

6. The device of claim 5 wherein a plate is mounted on the second end of the bracket and wherein the tilling tines are mounted on the plate and extend outward from the plate in the direction opposite the seed container.

7. The device of claim 6 wherein the plate has a center opening and wherein the plunger extends through the center opening in the plate.

8. The device of claim 7 wherein the container is positioned such that the opening is in fluid communication with the center opening of the plate.

9. The device of claim 5 wherein the bracket has a lid secured to the second end of the bracket and wherein the second end of the seed container is removably secured to the lid.

10. The device of claim 9 wherein the lid has at least one hole in fluid communication with the opening in the second end of the container.

11. The device of claim 10 wherein a metering valve is provided adjacent the hole in the lid to adjust a size of the hole to regulate flow through the hole.

12. The device of claim 10 wherein a plate having a center opening is mounted on the second end of the bracket, wherein the tilling tines are mounted on the plate and extend outward from the plate in the direction opposite the seed container and wherein the hole in the lid is in fluid communication with the center opening in the plate.

13. The device of claim 5 wherein the tilling tines have grooves which assist in tilling the ground.

14. The device of claim 5 wherein a length of the tilling tines extending outward from the second end of the bracket is slightly less than a length of the plunger extending outward from the second end of the bracket.

15. The device of claim 5 wherein the resilient member is a coil spring positioned around the plunger.

16. The device of claim 5 wherein the bracket includes spaced apart legs extending between the first and second ends of the bracket and wherein the seed container is mounted between the legs.

17. A method for tilling and seeding ground which comprises the steps of:
   a) providing a seeding device having a handle with opposed first and second ends forming a longitudinal axis of the device; a seed container having opposed first and second ends forming an inner chamber configured to hold seed with an opening in the second end of the seed container to allow seed to flow from the seed container, and removably mounted on the second end of the handle; tilling tines mounted adjacent the second end of the seed container and extending outward away from the seed container in a direction opposite the handle; a plunger having opposed first and second ends and mounted adjacent the second end of the seed container such that the first end of the plunger is positioned completely within the inner chamber of the seed container and does not extend out of the inner chamber and the second end of the plunger is positioned outside of the seed container and extends outward away from the second end of the seed container adjacent the tilling tines in the direction opposite the handle, and spaced apart from the opening in the second end of the seed container; a distribution plate mounted on the second end of the plunger and spaced apart from the opening in the second end of the seed container, so that the distribution plate does not interfere with the flow of seed from the seed container through the opening in the second end of the seed container; and a resilient member spaced between the distribution plate and the second end of the seed container for biasing the plunger into a fully extended position;
   b) removing the seed container from the handle;
   c) filling the inner chamber of the seed container with seed;
   d) removably mounting the seed container on the handle;
   e) grasping the first end of the handle;
   f) moving the seeding device toward the ground such that the second end of the plunger contacts the ground and is retracted toward the seed container and such that the tilling tines enter the ground wherein as the seeding device is moved toward the ground, seed in the inner chamber of the seed container moves through the opening in the seed container and contacts the distribution plate; and
   g) moving the seeding device away from the ground such that the tilling tines are removed from the ground and the plunger is moved to the fully extended position by the resilient member, wherein as the seeding device is moved away from the ground, seed in the inner chamber of the seed container moves through the opening of the seed container and wherein seed contacting the distribution plate is distributed onto the ground.

18. The method of claim 17 wherein a metering valve is positioned adjacent the opening in the seed container, and wherein before step (f), the metering valve is adjusted to adjust an amount of seed distributed to the ground.

19. The method of claim 17 wherein prior to step (d), the device is inverted such that the first end of the handle is adjacent to the ground and such that in step (d), the seed container is mounted on the handle with the opening in the second end facing upward, away from the ground.

20. The method of claim 17 wherein in step (f), the first end of the plunger moving within the seed container agitates the seed such as to assist in moving the seed through the opening in the second end of the seed container.

* * * * *